United States Patent [19]

Trelut et al.

[11] 3,737,869

[45] June 5, 1973

[54] ELECTRIC CONTROL DISTRIBUTOR

[75] Inventors: Jean Marie Trelut, La Celle St. Cloud; Jean Bernard Michel, Liot, Bailly, both of France

[73] Assignee: International Standard Electric Corporation, New York, N.Y.

[22] Filed: Feb. 11, 1972

[21] Appl. No.: 225,612

Related U.S. Application Data

[63] Continuation of Ser. No. 44,322, June 8, 1970, abandoned.

[52] U.S. Cl. ..........340/172.5

[51] Int. Cl. ..........G06f 11/00

[58] Field of Search ..........340/172.5; 179/18 GF, 175.2 C, 175.21

[56] References Cited

UNITED STATES PATENTS

| | | | |
|---|---|---|---|
| 3,576,541 | 4/1971 | Kwan | 340/172.5 |
| 3,626,383 | 12/1971 | Oswald et al. | 340/172.5 |
| 3,237,100 | 2/1966 | Chalfin et al. | 340/172.5 X |
| 3,517,123 | 6/1970 | Harr et al. | 179/18 |
| 3,400,374 | 9/1968 | Schumann | 340/172.5 |

*Primary Examiner*—Harvey E. Springborn
*Attorney*—C. Cornell Remsen, Jr., Walter J. Baum and Marvin M. Chaban et al.

[57] ABSTRACT

This distributor may be thought of as an interfacing circuit for use between a digital computer and peripheral equipment, such as a telephone exchange, controlled by the computer. The components of the peripheral equipment are bi-stable and may be operated in groups or singly. The interfacing circuit cyclically tests these bistable components through the operating program of the peripheral unit. At each test, a comparison check against the program is made.

3 Claims, 3 Drawing Figures

Patented June 5, 1973 3,737,869

3 Sheets-Sheet 1

INVENTOR
J. M. Trelut - J. B. M. Liot

BY Marin Chaban
ATTORNEY

ELECTRIC CONTROL DISTRIBUTOR

This is a continuation of application Ser. No. 044,322 filed June 8, 1970.

The present invention relates to electric control distributors. The term distributor here covers an arrangement of electric and electronic means which, for instance, make it possible to operate electromechanical components in the computer peripherals by carrying out the instructions of the computer and to check the position of these components so as to inform the computer on request from the latter. Thus the distributor according to the invention belongs to the common category of computer interfaces. Hereafter, we shall more specifically discuss an application of the distributor, according to the invention, in an automatic telephone exchange controlled by a computer ; however, it should be clear that the invention is applicable to any interface circuit capable of energizing and/or checking the electromechanical, or more generally, the bistable components, the latter having two positions "0" and "1," controlled by a computer whether said computer be located close to the interface and the components or remote from these devices.

In the application of the invention to telephone exchanges, the distributor is, for instance, used as an interface between the computer(s) of the exchange and the junctor circuits. In a telephone exchange controlled by a computer, the basic parts are the line circuits, the speech switching network and the junctor circuits, plus, obviously, the interfaces. The junctor circuits are sets of relays ; during a call they are, on the one hand connected via the switching network to a subscriber's line and, on the other hand, either to another subscriber's line, in the case of a local junctor circuit, or by an incoming link to another exchange, in the case of an incoming junctor circuit, or by an outgoing link, in the case of an outgoing junctor circuit. The succession of the condition of the relays in a junctor circuit determines the successive states of a call processed by the said juntor circuit. Said succession of conditions is determined by the computer, which causes a distributor to energize the appropriate relays ; conversely, the fact that the computer is aware of the conditions of the relays in a junctor circuit enables it to determine the state of the call. The interface distributor is obviously necessary, for computer speed must be matched to the relatively slow operation speed of a junctor circuit electromechanical relay.

There are two known types of distributors : those whereby, at each action of the computer, the whole set of relays in the junctor circuit is updated and those whereby each computer action is directed to a single relay. The first type involves, for each action, scanning the memory for all the binary bits corresponding to the condition of all the relays, whereas, perhaps, only one relay is to be energized, hence a lack of flexibility in the programming of the computer. The second type involves repeating the computer to distributor connecting operations for each action, thus losing precious time.

The aim of the present invention is a distributor which overcomes the disadvantages listed above and affords a better use and greater ease of programming of the computer. According to the invention, the distributor controls, at each action of the computer, either the updating of all the junction circuit relays, or the control (either setting, or resetting) of one or several relays, or again without changing the condition of the relays, transfers said condition into the computer. According to the invention, it is also provided that every time a control implies changing the condition of the relays, a check is carried out to ascertain that the condition assumed corresponds to the control instruction. To increase operational reliability, a check is also carried out on the parity in the orders transmitted to the distributor by the computer, any mistake detected provoking the return of the instructions to the computer. The same applies to any differences occuring as regards the condition reached and the instructed condition.

According to the invention, since a relay can only be switched in one of the two positions, set or reset, and since each separate instruction is transmitted in the form of a binary element, 1 or 0, the instruction message comprises a set of bits corresponding to the various relays plus two bits that yield four possible control combinations :

— Combination 11 for complete updating of the junction circuit,

— Combination 10 for setting one or several relays,

— Combination 01 for resetting one or several relays and

— Combination 00 for transmitting the condition of the relays into the computer.

Obviously the combination order can be changed for reasons of convenience. Moreover, the instruction message can comprise a parity bit.

According to the invention, as a distributor has access to several junctor circuits, the instruction message also comprises the coordinates of the junctor circuit to be processed, preferably be binary coded.

Thus the instruction message comprises four parts : the relays message, the junctor circuit message, the parity bit message and the control mode message or simply control message.

The distributor, according to the present invention, which comprises a memory for the instruction message and decoders to effect the selection of the junctor circuit from the junctor circuit message, is characterized in that it comprises individual decoders per relay, each individual decoder of a relay, depending on the bit stored for the corresponding relay and on the control message, connecting one of the two voltage switching circuits, one of the voltage (preferably that of the battery) setting the relay whereas the other (earth) resets the relay.

The distributor, according to the present invention, is, moreover, characterized in that it comprises a time base capable of defining at least two times, a control time and a comparison time, the above mentioned individual decoders only being operated during control time, and in that it comprises individual comparators per relay designed to compare, depending on the control message, the state of the corresponding relay with the bit stored in memory for the said relay, the said comparators only operating during comparison time, the outputs of the said comparators being collected by an OR gate and directed towards a fault circuit.

According to a further characteristic of the present invention, said comparators each comprise a comparison circuit made up for instance of an AND circuit the first input of which receives the relay condition signal and the second input of which receives another signal which is a function both of the stored relay bit and the control message (for instance for the three combinations 11, 10, 01 mentioned above, this other signal exists and for the fourth, 00, it is nonexistant) and a gate circuit the first input of which is connected to the output of the corresponding comparison circuit and the three other inputs of which are composed of the relay bit and the two control message bits, these three signals being combined to allow or prevent the first input signal passing through the gate circuit.

The invention will be described in detail with reference to its implementation in the control of junctor circuit relays in a telephone exchange operated by a computer with reference to the appended drawings in which.

Figure 1:
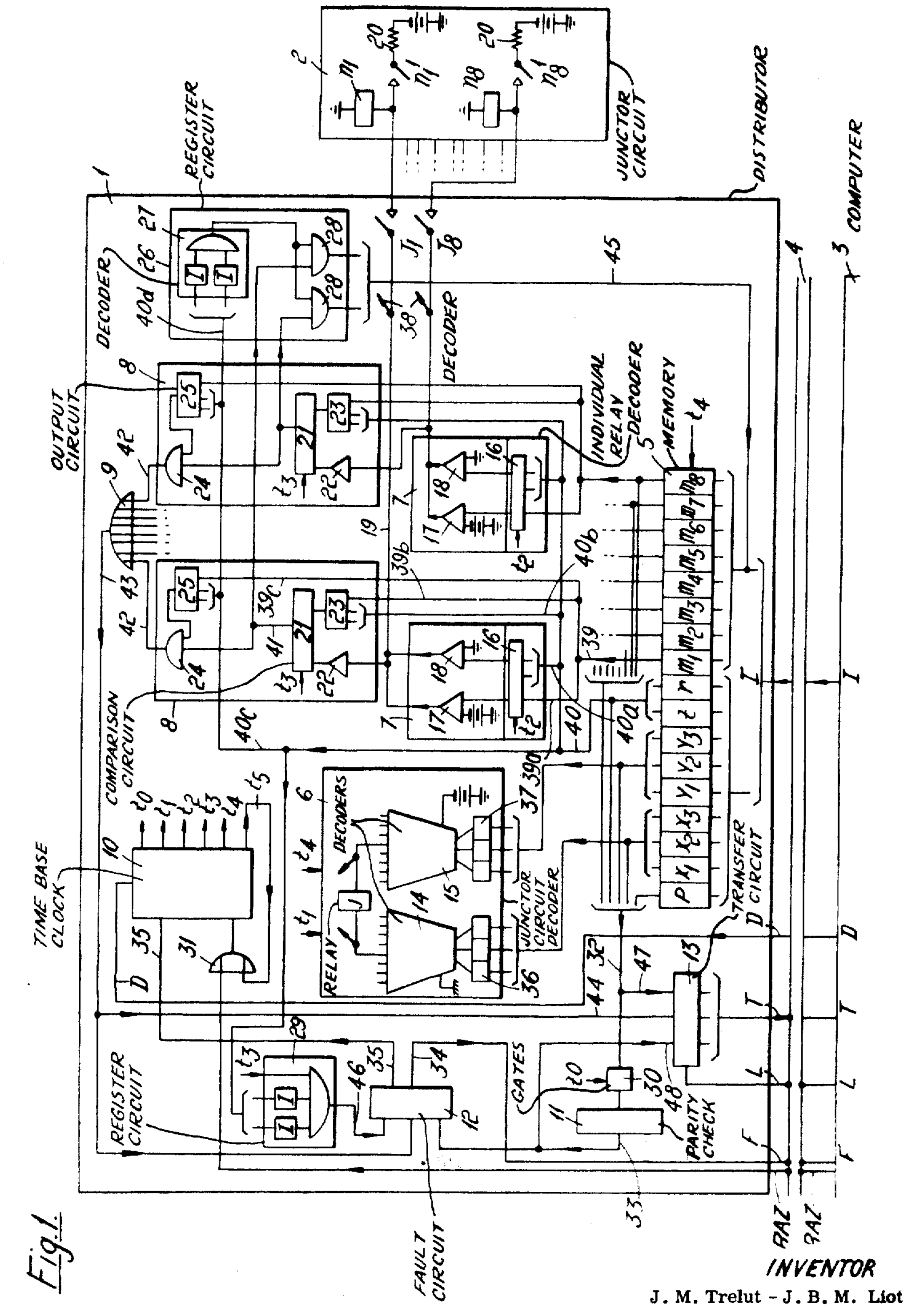
FIG. 1 is a schematic diagram of the general layout of the parts whereby the control of the relays of a given junctor circuit is ensured as is the testing of the position of the said relays subsequent to an instruction from the computer.

An embodiment example is described hereafter in which the distributor according to the invention is designed to control and check the junctor circuit relays in a telephone exchange operated by a computer.

The distributor is shown in 1, one of the junctor circuits of the telephone exchange in 2 and the computer in 3. Located between distributor 1 and computer 3 the diagram shows the connecting means which, in the case of a telephone exchange, are busbar 4. Distributor 1 comprises memory 5, capable of recording the instruction message sent by computer 3 to distributor 1. Memory 5 can be made up of flip-flops ; it comprises from left to right a flip-flop to record the parity binary element, followed by six flip-flops to record the junctor circuit message, i.e., the message that gives the identity of the junctor circuit to be controlled, then two flip-flops for the control message and finally, eight flip-flops for the relay messages. The storage of the messages in the flip-flops is effected from the bottom, connected to link I and the outputs are effected from above. The junctor circuit decoder is shown in 6 ; said decoder, depending on the junctor circuit message transmitted to it by memory 5, determines the junctor circuit to be controlled and establishes the link between distributor 1 and junctor circuit 2 to be controlled. Reference 7 designates the individual relay decoders which, depending on the binary element stored in memory 5 and on the content of the control message, determine the polarity to be applied to the relay to be controlled in junctor circuit 2. Reference 8 designates the individual relay comparators which are designed to check that the condition reached by each relays corresponds to the control instruction. An OR gate 9 has its inputs connected to the outputs of comparators 8. 10 shows a time base circuit which defines for each operation of the distributor five elementary periods of time the main ones of which are the relay control time and the condition of relays checking time. 11 is a schematic diagram of a circuit whereby the parity of the whole of junctor circuit message, control message and relay messages can be checked against the parity be. A fault circuit 12 is designed to halt operations, i.e., the operation of time base 10, in certain conditions and to warn the computer. Finally a transfer circuit 13 is provided for to transfer to computer 3 the elements inscribed in memory 5 plus, possibly, certain conditions of distributor 1 when the computer requests the transfer of these data.

The decoder of junctor circuit 6 comprises two decoder of co-ordinates 14 and 15 which are digital binary decoders. At their input, there are three binary elements which correspond to eight digital outputs. The eight outputs of each decoder of co-ordinates 14 and 15 are organized in a matrix thus enabling an eight times eight control to be effected, i.e., sixty four J relays. Each J relay corresponds to a junctor circuit 2 that can be controlled by distributor 1 ; contacts $J_1$ to $J_8$ of relay J link up distributor 1 with the selected junctor circuit 2. The operation of relay J is ensured since left hand decoder 14 connects the relay to earth whereas right hand decoder 15 connects the relay to the battery.

One of relay decoder 7 comprises an instruction decoder 16 and two voltage switching circuits 17 and 18. Circuit 17 sets a relay in junctor circuit 2, whereas circuit 18 resets it. In the embodiment example, it is assumed that each junctor circuit 2 comprises eight relays $n_1$ to $n_8$ at the most which corresponds to eight cells $m_1$ to $m_8$ in memory 5 and to eight relay decoders 7 the first left hand one of which is shown, corresponding to relay $n_1$ and the last right hand one, corresponding to relay $n_8$. Assuming that an instruction be issued to set relay $n_1$. Relay $n_1$ standing at rest, contact $n_1$ is opened and the relay is simply connected by contact J of relay J to wire 19 which is connected to the output of 17 and the output of 18. To set relay $n_1$, circuit 17 will be energized, i.e., it will connect wire 19 to the potential of a battery. Relay $n_1$ being set up by battery 17, wire 19, contact J set, its winding and earth, will close its contact $n_1$ and will be maintained by the battery, resistance 20, contact $n_1$ set, its winding and earth. Assuming, on the other hand, that relay $n_1$ being set, the instruction is to reset it. In this case, earth is applied at wire 19 via circuit 18, thus short circuiting the winding of relay $n_1$ which is released and which opens its contact $n_1$ thus maintaining it at rest.

The table below shows the energized or non energized state of some circuits according to the contents of the control message ($t$,$r$) and the relay bit $m$ stored in 5.

| | | time | $t_2$ | $t_2$ | $t_3$ | $t_3$ | $t_3$ | $t_3$ |
|---|---|---|---|---|---|---|---|---|
| $t$ | $r$ | $m$ | 17 | 18 | 23 | 25 | 27 | 29 |
| 1 | 1 | 1 | 1 | 0 | 1 | 1 | 0 | 0 |
| 1 | 1 | 0 | 0 | 1 | 0 | 1 | 0 | 0 |
| 1 | 0 | 1 | 1 | 0 | 1 | 1 | 0 | 0 |
| 1 | 0 | 0 | 0 | 0 | 0 | 0 | 0 | 0 |
| 0 | 1 | 1 | 0 | 0 | 1 | 0 | 0 | 0 |
| 0 | 1 | 0 | 0 | 1 | 0 | 1 | 0 | 0 |
| 0 | 0 | 0 | 0 | 0 | 0 | 0 | 1 | 1 |
| 0 | 0 | 1 | 0 | 0 | 0 | 0 | 1 | 1 |

An energized circuit corresponds to an energized output and a non energized circuit to a disconnected or nil output. Instruction decoders 16 constitute the means which make it possible, depending on the control message and the relay condition, to energize either 17 or 18. For instance if the control message is 10 i.e., if it corresponds to a setting combination for one or several relays and that the condition of the relay is 1, decoder 16 corresponding to this relay will energize circuit 17 and will not energize circuit 18. In the truth table, we read facing message 101, a 1 for 17 and a 0 for 18. An embodiment example of decoder 16 will later be described with reference to FIG. 2.

Each comparator 8 comprises a comparison circuit 21, an amplifier 22 and a comparison decoder 23 which together constitute the comparison circuit proper. Moreover each comparator 8 comprises an AND gate 24 and a validation decoder 25. The states of the outputs of decoders 23 and 25 are given in the truth table above. By way of example, by considering the case in which the control message is 10 and the relay condition 1, it can be seen that the output of 23 will let a 1 pass which represents the relay condition and which must be compared in 21 with the condition of the relay which will normally be set, i.e., the output of 22 also will be equal to 1. In this case, 21 has an output 0. On the other hand, as regards output 25, the latter is equal to 1 as, in fact, the result of the comparison, i.e., the outgoing signal from 21 must be taken into account, that is validated. But, if we consider now control message 10 with the relay being 0, the output of 23 will be 0, but the point is that the output of 25 will be equal to 0, i.e., the comparison of the condition of the relay and the binary element must not be taken into account since control message 10 corresponds to the "set relay" combination whereas the relay condition indicates that the state of the relay should remain unchanged.

The outputs of circuits 21 are connected to registering circuit 26 which registers the states of the outputs of 21 in memory 5 provided that the control message is 00. The registering circuit 26 comprises a decoder 27 and a set of AND gates 28. There are as many AND gates as there are outputs of comparators 21, i.e., as many as there are relays in a junctor circuit. The state of the output of decoder 27 is given in the above truth table.

Circuit 11 is a conventional parity circuit via which the bits are added first two by two, then the results of the addition are added two by two, and so on, and lastly the result is added to the binary element in such a way that if the parity of the message is right, the output of 11 is nil — 0 — whereas if it is wrong, this output is 1. The additions in circuit 11 obviously do not include carry-over figures and the adders are exclusive OR circuits.

Circuit 12 is a fault circuit which is energized either when parity circuit 11 has an output equal to 1 or when gate 9 which collates the outputs of coparators 8 also has an output 1. Moreover, fault circuit 12 is also energized when circuit 29 is energized. Circuit 29 can be similar to circuit 27 and it output shows the states given in the above truth table. The output of fault circuit 12 is connected to the time base circuit 10 and stops the operation of said circuit 10 when the output is energized. Moreover, the output of 12 is also fed into computer 3 ; the latter, using means not described here for they are well known to the technician, can detect the faulty state from circuit 12, i.e., in fact the faulty state in distributor 1 and cause the data contained in 5 as well as the output data of 11 and 9 to be transferred to it.

To this end, a transfer circuit 13 is provided for, the inputs of which are connected to the outputs of memory 5 as well as to the outputs of circuit 11 and of gate 9. This transfer circuit can comprise a set of AND gates the first input of each of which is connected as mentioned above, whereas the second input is controlled by the computer.

Before proceeding with the description of operations, the time base circuit 10 will be briefly described. Circuit 10 comprises a clock circuit which is triggered off immediately the distributor has been chosen by a computer to effect the relay control in a junctor circuit. Input D is energized and the clock is triggered off for a cycle comprising five successive time periods. The first period is $t_0$ during which the data of store 5 are applied at parity computing circuit 11 via a set of gates shown in 30. These gates are AND gates, one input of which is connected to output 1 of a flip-flop in store 5 and the other one of which is connected to that output of circuit 10 in which is marked during time period $t_0$. The second period $t_1$ corresponds to the selection and setting of the relay J corresponding to the junctor circuit to be controlled. Time period $t_2$ corresponds to the effective control of the junctor circuit relays, it is in fact at this moment that decoders 16 are energized and select switch 17 or 18. Time period $t_3$ corresponds to the comparison time. During this period decoders 23, 25 and possibly 26 and 29 are energized. Time period $t_4$ allows for the resetting of all the flip-flops, i.e., of all distributor storage, and in particular, of memory 5 and of the storage flip-flops contained in decoders 14 and 15. Finally, a time period $t_5$ which is very short, resets the time base via its RAZ input and an OR gate 31. In view of a case where a fault occurs and the time base 10 programme must be interrupted, the OR gate second input is connected to computer 3.

The operation of distributor 1 is as follows : Initially computer 3 selects a distributor provided for controlling the junctor circuit which the computer has chosen to control. As soon as distributor 1 has been selected, and the means implemented by the computer to make its selection will not be included in the present description, a complete message is sent by the computer 3 to busbars 4 and to memory 5, at the same time the computer puts a signal on wire D which triggers off time base 10. During time period $t_0$ memory 5 outputs are, via link 32 applied at circuit 11 via circuit 30 gates which are open. There are two possible cases : the parity of the message to be recorded is right, then, output 33 of 11 stands at zero and circuit 10 can move into time period $t_1$. Should the parity be wrong, output 33 turns to 1, it is applied to fault circuit 12 output 35 of which equal to 1 brings about via fault input 35 of the time base circuit, a halt in the clock circuit in this position. Moreover, output 34 equal to 1 places a polarity on wire F. During its operational cycle the computer will find this polarity on wire F and will then trigger off the transfer procedure in the computer of data contained in store 5.

Assuming that the parity is right : During time $t_1$, the be recorded in flip-flops $x_1$, $x_2$, $x_3$ and transmitted to flip-flop memories 36 of decoder 14 and the condition recorded in $y_1$, $y_2$, $y_3$ are transmitted to corresponding memories 37 of decoder 15. Consider a case where flip-flops $x_1$, $x_2$, $x_3$ contain message 011, then decoder 14 applies an earth to the fourth output from the left as shown in FIG. 1. If flip-flops $y_1$, $y_2$, $y_3$ contain message 100 a battery will be applied to the fifth output wire of decoder 15, as shown in the Figure. Relay J which corresponds to these two coordinates 4 and 5 will be energized. It then closes contacts $J_1$ to $J_8$ whereby distributor 1 is connected to the selected junctor circuit 2. A conductor multiple 38 is shown to indicate that the distributor can be connected to several junctor circuits. In the example chosen, the number of junctor circuits is equal to 64.

During time $t_2$ the outputs of store 5 connected via links 39 and 39*a* to decoders 16 will be used in the latter. Similarly outputs *t* and *r* via links 40 and 40*a* will be used in decoders 16. In accordance with the above and with the above-mentioned truth table, either switch 17 or 18 will be energized unless the two remain at rest. By way of example, assuming that *trm* is 111, switch 17 will place a battery on wire 19 and relay $n_1$ of junctor circuit 2 will be energized.

During time $t_3$, the outputs of $m_1$ to $m_8$ become energized in decoders 23 via 39 and 39*b*. Similarly the outputs of *t* and *r* become energized in 23 via 40 and 40*b*. The output of 23 will yield a signal according to the truth table above. At the same time, amplifier 22 which is a measuring amplifier and a description of which will be given with FIG. 3, will have measured the potential on wire 19. It should be noted that at moment $t_3$ switches 17 and 18 have all reverted to rest, i.e., the wires leading from 19 to 17 and 18 are blinded. Depending on whether relay $n_1$ is set or reset, wire 19 has a negative voltage or is earthed. Amplifier 22 yields an output 0 when wire 19 is earthed and an output 1 when its potential is negative. In circuit 21, the binary output signals from 22 and 23 are, for example, added. If they are both equal to 0, the output of 21 is 0, if they are both equal to 1, the output of 21 is 0, but if one of the two is equal to 0 whereas the other is equal to 1, 21 will show output 1. Circuit 21 can be an exclusive OR circuit. Also at time $t_3$, via 39*c*, the outputs of 5 are energized in 25 whereas via 40 and 40*c*, the outputs of *r* and *t* are energized in the same circuit 25. The output of 25 corresponds to that shown in the above truth table and lets the data from output 41 of 21 pass or prevents it from doing so via gate 24. Outputs 42 of the eight gates 24 are connected to the inputs of OR gate 9. In a case where the comparison is effected if it does not show a discordance between the condition of the relays and the binary control elements, the output of gate 9 is 0 ; on the other hand, if there is any discordance, output 43 of 9 turns to 1. Output 43 43 is connected to fault circuit 12 and energizes output 34 and 35. Moreover, output 43 is connected to the input 44 of registering circuit 13. If any discordance has occurred, time base 10 is halted in time position $t_3$. The following process is the same as when a parity fault occurs, i.e., a polarity is applied on wire F.

In a case where the control message is 00, the comparison proper does not take place, as is shown in the truth table. However, the registering circuit 26 allows the registering of the outputs of circuits 21 in store 5 via wires 45. In fact, circuit 27 is energized by the outputs from *tr* through 40, 40*c*, 40*d* and its output energizes gates 28. Flip-flops $m_1$ to $m_8$ take up a position like that of the conditions of the relays in junctor circuit 2. Finally it will be understood that the condition of these relays is given by the state of outputs 41 of comparators 21. In fact if relay $n_1$ is at rest, an 0 stands at the output of 22. As outputs 23 all have an 0, there is an output 0 at 21. However, if the relay, for instance $n_8$ is set, the output of 22 is 1, and as the output of 23 is 0 anyway, the output of 21, for relay $n_8$ will be a 1.

Still during time period $t_3$, the output of circuit 29 is energized as shown in the truth table and its output 46 causes a 1 to stand at output 35 of fault circuit 12, which stops circuit 10 in time period $t_3$ position and places a polarity on wire F. From this point the process is the same as if a parity fault had occurred.

Let us assume that a fault has in fact occurred. The computer warned by wire F connects itself up to distributor 1 using means not shown and, via omnibus line 4, sends via wire L a read out signal to the gates of 13. Link 32 is then extended through 13 and to the computer via 47 and link T. Moreover, the signals standing on wire 44 and wire 48, connected to output 33 of 11, are also read. There are three possible cases : either a parity fault has occurred — wire 48 bears a signal and the computer knows that the data transfered to it contains a parity fault — or wire 44 bears a signal and the computer knows that the condition set in the control message for the relays differs from the actual condition of the latter — or there is no signal standing on 48 or on 44 and the computer knows that the contents of cells $m_1$ to $m_8$ that is transmitted to it gives the actual condition of the relays of junctor circuit 2.

At time period $t_4$, the flip-flops of 5 and those of 36 and 37 are reset, and finally at time $t_5$ the clock of circuit 10 is also reset. It is of course clear that, from time $t_5$ distributor 1 is free and can establish a new control connection towards a junctor circuit when it is seized by computer 3. Remember that in a case where circuit 10 is stopped at $t_1$ or $t_3$, the computer resets circuit 10 after having operated the data transfer via 13.

Figure 2:
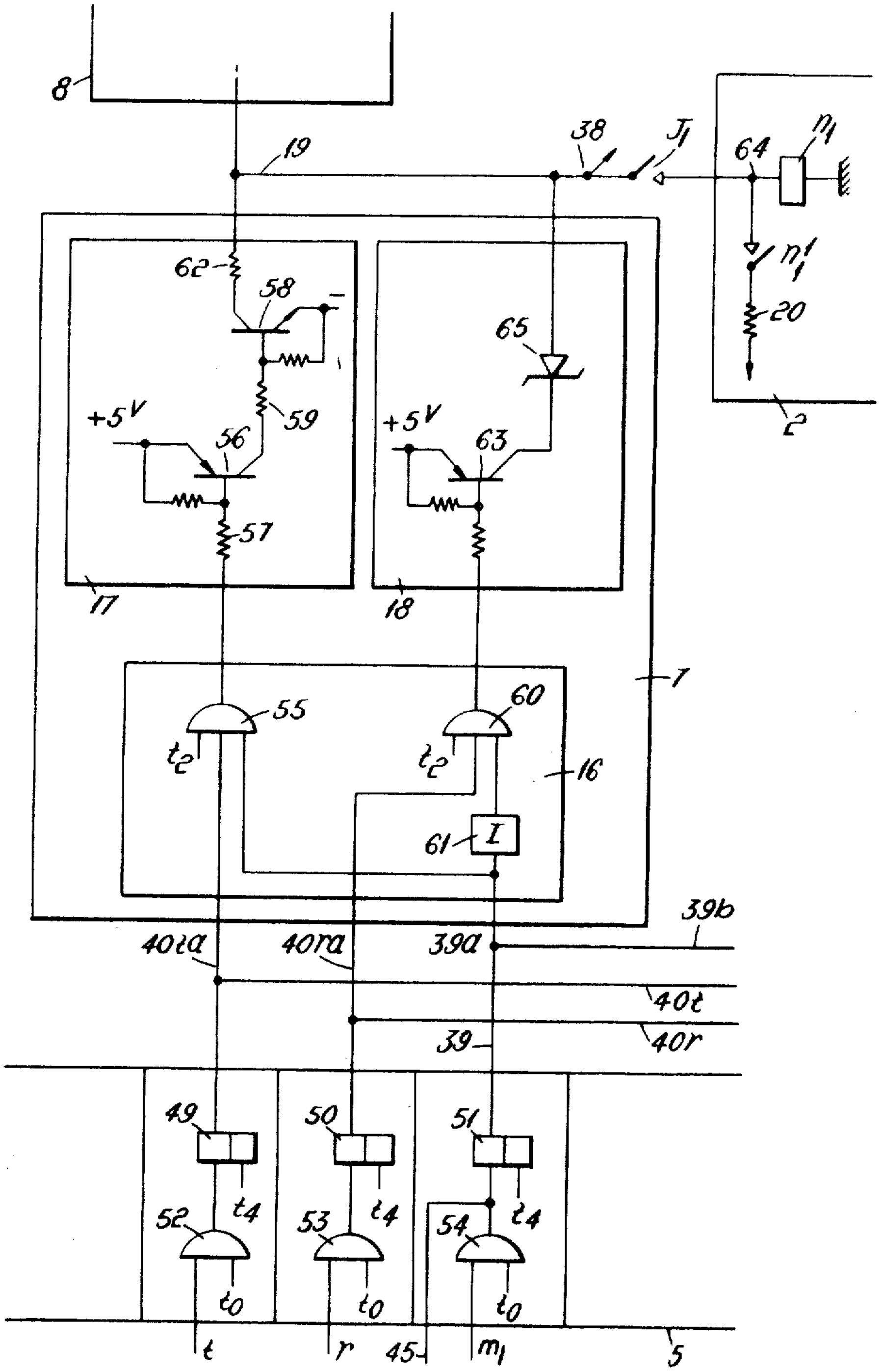
FIG. 2 is a detailed diagram of an instruction decoder and two voltage switches which control the operation of a junctor circuit relay.

FIG. 2 shows in detail an instruction decoder 16 and the two voltage switches 17 and 18 which control relay $n_1$ of junctor circuit 2.

On this Figure, we have shown in 5, three memory cells corresponding to those of *t*, of *r*, and of $m_1$ respectively for instance. Each cell comprises a flip-flop 49 or 50 or 51 and a recording AND gate 52 or 53 or 54. Input wires *t*, *r* and in are connected to omnibus line 4 (FIG. 1) whereas the second inputs are energized during time $t_0$. In the $m_1$ cell, flip-flop 51 is moreover connected to wire 45 which makes possible the registering of the actual condition of the relay in the circumstances, described with reference to FIG. 1. At time $t_4$, all the flip-flops are reset.

Generally speaking, all the relays for which the flip-flop in memory 5 records a 1, will be set or maintained in a set position if a 1 has been recorded by flip-flop 49 (*t*) ; all the relays for which the flip-flop records an 0 will be reset or maintained in a reset position if a 0 has been recorded by flip-flop 50 (*r*).

If message 101, for instance, recorded by the flip-flops in 5, relay $n_1$ will have to be set at time $t_2$ : 1 appears at flip-flop 49, 0 at 50 and 1 at 51.

At time $t_2$, a 1 is connected via 40*$t_a$*, 39*a* and $t_2$ to the three inputs of AND gate 55 and 1 (earth) is then standing at the output of gate 55 and at the base of transistor 56 via resistance 57. The emitter of this transistor having a positive potential (for instance +5$^v$), the transistor is saturated and said positive potential is placed at the base of transistor 58 via resistance 59. A current is set up from positive potential +5$^v$ of the emitter of 56 via the collector, resistance 59, the base of 58 and its emitter to the negative potential of the telephone exchange. Transistor 58 which is saturated allows relay $n_1$ to operate. The winding of said relay is earthed, and a current is set up through the relay via : earth, the winding of relay $n_1$, contact $J_1$, wire 19, protection resistance 62, the collector and the emitter of transistor 58 and the negative battery. Relay $n_1$ via its contact $n_1$ blocked, said contact being connected to the negative battery via resistance 20.

It should be noted at this point that in the case where relays only are to be energized, the 0 recorded on flip-flop 50 and which would mean the resetting of the relay has no action ; in fact, in the case of 101 message, at the inputs of gate 60 we have the following : 0 from flip-flop 50, 0 from flip-flop 51 (1 via invertor 61 yields 0) and 1 of time $t_2$, therefore nothing is connected to the base of transistor 63. If, in the same case, i.e., a relay $n_1$ to be set, the message recorded has been 111, the result would have been the same. The following would have stood at the three inputs of 61 : a 1 yielded by flip-flop 50, a 0 yielded by 51 after inversion of 1 by inverter 61 and a 1 of time $t_2$, therefore nothing would have been connected to the base of transistor 63.

If relay $n_1$ which is set was to be reset, the message recorded by the three previous flip-flops would be 010. Via 40*ra*, 39*a* and $t_2$ the following would be standing at the three inputs of gate 55 : 0, 1 and 1 and nothing would be connected to the base of transistor 56, whereas at the three inputs of 60 would stand : 1 from flip-flop 50, 1 from flip-flop 51 (0 inverted by invertor 61) and 1 from $t_2$. Thus an earth would be connected to the base of transistor 63 and a current would be set up from its emitter towards gate 60.

Transistor 63 having been made conducting in this way, the low positive potential of the transmitter ($+5^v$ for example) would be connected to point 64 via zener diode 65. This $+5^v$ potential short circuits earthed relay $n_1$ which releases and opens its holding contact $n_1$.

Figure 3:
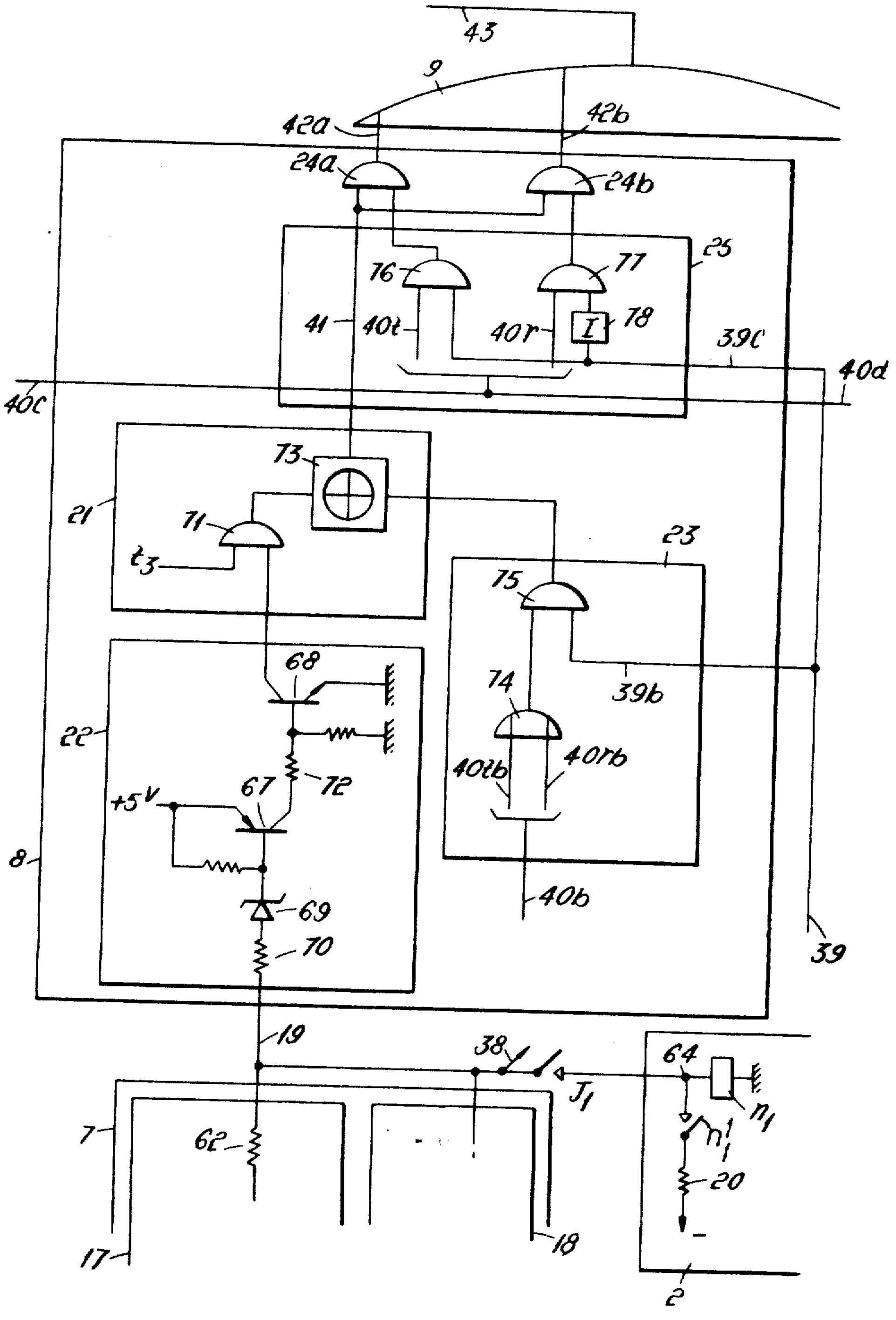
FIG. 3 is a detailed diagram of the comparison circuits for the condition of the junctor circuit relays.

FIG. 3 shows part 8 of FIG. 1, which operates as a comparator for the condition of the relay after carrying out the instruction message recorded in the flip-flops of memory 5. For each relay "*n*" to be controlled, it comprises:

—an amplifier 22 comprising two transistors 67 and 68 mounted in tandem, the base of transistor 67 being connected to output wire 19 of relay decoder 7 via zener diode 69 and resistance 70 ;

—a comparison circuit 21 which comprises an "AND" gate 71 one input of which is connected to the collector of transistor 68, and the other to time $t_3$ of the time base circuit and the output to an "exclusive OR" gate 73. The output of this gate via wire 41 is connected to one input of gates 24*a* and 24*b* (in FIG. 1 these two gates are represented by a single gate bearing reference 24);

—a decoder 23 comprising an "OR" gate 74 the input of which are connected to wires 40*tb* and 40*rb* connected to cells *t* and *r* of 5 via links 40*b* and 40. The output of said gate 74 is connected to an input "AND" gate 75, the other input of 75 being connected to wires 39*b* and 39 of cell *m* 1 of 5. The output of gate 75 is connected to the right hand input of gate 73 of comparison circuit 21;

—a validation decoder 25 which comprises two "AND" gates 76, 77 and an invertor 78. An input of gate 76 is connected to wire 40*t* which via 40*c* leads to cell *t* of 5, the other input is connected to wire 39*c* then 39 which comes from cell *m* 1 to 5 ;

—comparator 8 then comprises, for each relay "*n*" to be controlled, "AND" gates 24*a* and 24*b* one input of each one of which is linked up by wire 41 to the output of gate 73 of comparison circuit 21, the second input of 24*a* is connected to the output of gate 76 ; the second input of 24*b* is connected to the output of 77 ; the outputs of 24*a* and 24*b* each being connected to an input of "OR" gate 9 via wires 42*a* and 42*b*.

Going back to the first example mentioned when discussing FIG. 2 in which relay $n_1$ is to be set, it can be seen that the three cells *t*, *r* and *m*, together have recorded 101. In these conditions, contact $n_1$ being closed, a negative potential of approximately $-24^v$ is applied to point 64, the winding resistance of relay $n_1$ being substantially equal to the holding resistance 20. Transistor 67 and zener diode 69 are made open by this negative potential, a slightly positive potential of $+5^v$ being applied at the emitter of 67. The $+5^v$ potential is thus applied to the base of transistor 68 which is made open, the current being set from the $+5^v$ potential at the emitter of 67 via the collector of this transistor, via resistance 72, and the base and the emitter of 68 to earth. At time $t_3$ gate 71 is supplied with a 1 from $t_3$ and a 1 from the collector of 68, a 1 is thus connected to the left hand input of gate 73.

In this assumed case in which relay $n_1$ is to be set, a 1 is connected to the left hand of "OR" gate 74 and a 0 (*r*) to the right hand input of this same gate, a 1 is thus standing at its output connected to the left hand input of "AND" gate 75. The right hand input of this same gate has a 1 from flip-flop $m_1$ via wire 39 then 39*b* and a 1 is therefore at the output of said gate 75. "Exclusive OR" gate 73 has in this case a 1 at its left hand input and a 1 at its right hand input ; it therefore has a 0 at its output to 24*a* and 24*b*.

"AND" gate 76 in the case just discussed has a 1 from flip-flop t of memory 5 at its left hand input and a 1 from flip-flop $m_1$ at its right hand input (wire 39*c*) ; a 1 therefore stands at its output connected to the right hand input of "AND" gate 24*a* the left hand input of which, connected to the output of 73, bears a 0. A 0 therefore stands at its output connected to "OR" gate 9 via wire 42*a*.

"AND" gate 77, on the other hand, has a 0 at its left hand input (flip-flop *r* of 5 via wire 40*r*) and a 0 at its right hand input (1 from $m_1$ transformed into 0 by invertor 78), an 0 there stands at its output. "AND" gate 24*b* then has at its left hand input the 0 from the output of 73 and the 0 from the output of 77 at its right hand input. A 0 stands at its output connected via wire 42*b* to one of the inputs of 9. "OR" gate 9 receiving no signal from 24*a* nor from 24*b*, fault circuit 12 via wire 43 receives no signal.

If, on the other hand the instruction recorded (101) has not been performed, relay $n_1$ is at rest at comparison time $t_3$ and the earth potential is at point 64 ; in these conditions transistors 67 and 68 remain blocked and a 0 (via 68) and a 1 (via $t_3$) standing at the inputs of 71, a 0 stands at its output.

As indicated above, a 1 stands at the output of 75, gate 73 supplied with the 1 from 75 and the 0 from 71 yields an output 1. Gate 24*b* supplied with the 1 from 73 and the 0 from 77 yields an output 0 to 9 whereas gate 24*a* supplied by the 1 from 73 and the 1 from 76 delivers a 1 to "OR" gate 9. This signal warns fault circuit 12 as was said when we referred to FIG. 1.

The two examples described above : operation of relay $n_1$ and performance fault, as well as the case of resetting said relay, with the possible fault consisting of the failure to carry out the instruction, are grouped in the following table. The state of the transistors, memory flip-flop and comparator gates and the signal standing at the output of gates 24*a* and 24*b* as a function of the instruction and its either being or not carried out have been indicated.

| Gates | 67 | 68 | 71 | $t$ | $r$ | 74 | $m_1$ | 75 | 73 | 76 | 24a | 78 | 77 | 24b |
|---|---|---|---|---|---|---|---|---|---|---|---|---|---|---|
| Instruction 101: | | | | | | | | | | | | | | |
| $n_1$ set | open | open | 1 | 1 | 0 | 1 | 1 | 1 | 0 | 1 | $\underline{0}$ | 0 | 0 | $\underline{0}$ |
| $n_1$ reset | blckd | blckd | 0 | 1 | 0 | 1 | 1 | 1 | 1 | 1 | $\underline{1}$ | 0 | 0 | $\underline{0}$ |
| Instruction 010: | | | | | | | | | | | | | | |
| $n_1$ reset | blckd | blckd | 0 | 0 | 1 | 1 | 0 | 0 | 0 | 0 | $\underline{0}$ | 1 | 1 | $\underline{0}$ |
| $n_1$ set | open | open | 1 | 0 | 1 | 1 | 0 | 0 | 1 | 0 | $\underline{0}$ | 1 | 1 | $\underline{1}$ |

Although the principles of the present invention have been described hereinabove with a reference to a particular example of embodiment, it will be clearly understood that the said description has been only made by way of example and does not limit the scope of the invention.

What we claim is:

1. A circuit condition testing apparatus for testing the condition of a plurality of bistable components in each of a plurality of peripheral units of a digital computer, there being a like number of said components in each unit, the invention comprising timing sequence control means, for operating said apparatus, a memory store receptive of control information from said computer for effecting the testing of said components in a selected one of said units under the control of said timing means, means responsive to the initiation of a first sequence by said timing means for recording a test control message in said memory store and means operative during said one sequence for checking the parity of the message recorded in said store, means responsive to a finding of parity for triggering said timing means into a later sequence, means operative during a first period of said later sequence to activate the selected one of said units whose address has been stored as part of said test control message, means for setting the plurality of components in said selected unit in one of a plurality of predetermined patterns responsive to said test control message, means operative during a second period of said later sequence for comparing the response of each of said components to said setting against the pattern recorded in said test control message, and means responsive to said comparison for indicating the results of said comparison testing to said computer.

2. An apparatus as claimed in claim 1 further comprising means responsive to a failure to find parity in said one sequence for stopping said timing means from further sequence.

3. An apparatus as claimed in claim 2, wherein there are transfer means responsive to said parity failure for indicating said failure to said computer for transferring the message stored in said memory store to said computer, and means responsive to a further a signal from said timing means for resetting said timing control means.

* * * * *